US009424959B2

(12) United States Patent
Zhang et al.

(10) Patent No.: US 9,424,959 B2
(45) Date of Patent: Aug. 23, 2016

(54) CONDUCTIVE FULL VULCANIZED THERMOPLASTIC ELASTOMER AND ITS PREPARATION METHOD (75) Inventors: Xiaohong Zhang, Beijing (CN); Jinliang Qiao, Beijing (CN); Guicun Qi, Beijing (CN); Zhihai Song, Beijing (CN); Chuanlun Cai, Beijing (CN); Ya Wang, Beijing (CN); Jianming Gao, Beijing (CN); Hongbin Zhang, Beijing (CN); Jinmei Lai, Beijing (CN); Binghai Li, Beijing (CN); Haosheng Wang, Beijing (CN); Yilei Zhu, Beijing (CN)

(73) Assignees: China Petroleum & Chemical Corporation, Beijing (CN); Beijing Research Institute of Chemical Industry China Petroleum & Chemical Corporation, Beijing (CN)

( * ) Notice: Subject to any disclaimer, the term of this patent is extended or adjusted under 35 U.S.C. 154(b) by 57 days.

(21) Appl. No.: 14/001,948

(22) PCT Filed: Mar. 2, 2012

(86) PCT No.: PCT/CN2012/071865
§ 371 (c)(1),
(2), (4) Date: Nov. 4, 2013

(87) PCT Pub. No.: WO2012/119526
PCT Pub. Date: Sep. 13, 2012

(65) Prior Publication Data
US 2014/0054512 A1    Feb. 27, 2014

(30) Foreign Application Priority Data

Mar. 4, 2011  (CN) .......................... 2011 1 0052076
Mar. 4, 2011  (CN) .......................... 2011 1 0052093
Mar. 4, 2011  (CN) .......................... 2011 1 0052106

(51) Int. Cl.
H01B 1/24   (2006.01)
C08J 5/00   (2006.01)
(Continued)

(52) U.S. Cl.
CPC . *H01B 1/24* (2013.01); *C08J 5/005* (2013.01); *C08K 5/54* (2013.01); *C08L 9/02* (2013.01);
(Continued)

(58) Field of Classification Search
CPC .............. H01B 1/00; H01B 1/24; C08K 3/04; C08F 8/30; C08L 83/00
USPC ..................... 252/511; 525/176, 523; 524/588
See application file for complete search history.

(56) References Cited

U.S. PATENT DOCUMENTS 6,423,760 B1   7/2002 Qiao et al.
6,838,490 B2   1/2005 Zhang et al.
(Continued)

FOREIGN PATENT DOCUMENTS

CN    1353131 A    6/2002
CN    1381524 A    11/2002
(Continued)

OTHER PUBLICATIONS

Supplementary European Search Report issued from European Patent Office in the corresponding European Patent Application No. 12755604, dated Apr. 2, 2015 (7 pages).
(Continued)

*Primary Examiner* — Mark Kopec
*Assistant Examiner* — Danny N Kang
(74) *Attorney, Agent, or Firm* — Finnegan, Henderson, Farabow, Garrett & Dunner, LLP (57) ABSTRACT

The invention provides a conductive full vulcanized thermoplastic elastomer and its preparation method, and relates to the technical field of full vulcanized thermoplastic elastomer. The full vulcanized thermoplastic elastomer is obtained by melt-blending components including rubber particles having crosslinking structure with mean particle diameter of 0.02 to 1 µm, carbon nanotubes as conductive fillers and thermoplastic plastics once, wherein the weight ratio of the rubber particles and the thermoplastic plastics is from 30:70 to 75:25 and the content of conductive fillers is from 0.3 to 10 weight parts based on the total weight of rubber particles and thermoplastic plastics of 100 weight parts. The resulting conductive full vulcanized thermoplastic elastomers have low content of conductive fillers and excellent combination performances. It can be prepared by conventional rubber processing methods and can be used to produce electronic production equipment, means, electronic instrument, instrument housing and decorative materials of clean production workshop having static resistance, electro magnetic interference resistance and clean requirement.

17 Claims, 3 Drawing Sheets (51) Int. Cl.
*C08K 5/54* (2006.01)
*C08L 101/00* (2006.01)
*C08L 9/02* (2006.01)
*C08L 9/06* (2006.01)
*C08L 23/08* (2006.01)
*C08K 3/04* (2006.01)

(52) U.S. Cl.
CPC ............... *C08L 9/06* (2013.01); *C08L 23/0815* (2013.01); *C08L 101/00* (2013.01); *C08J 2309/06* (2013.01); *C08J 2325/10* (2013.01); *C08K 3/04* (2013.01); *C08K 2201/001* (2013.01); *C08K 2201/011* (2013.01)

(56) References Cited

U.S. PATENT DOCUMENTS

| | | | |
|---|---|---|---|
| 7,491,757 | B2 | 2/2009 | Qiao et al. |
| 2003/0045638 | A1* | 3/2003 | Qiao et al. ............... 525/178 |
| 2004/0144963 | A1 | 7/2004 | Braig et al. |
| 2004/0181005 | A1 | 9/2004 | Warth et al. |
| 2007/0135571 | A1* | 6/2007 | Ellul et al. ............... 525/88 |
| 2010/0301282 | A1 | 12/2010 | Minagoshi |
| 2011/0204298 | A1 | 8/2011 | Chang et al. |

FOREIGN PATENT DOCUMENTS

| | | |
|---|---|---|
| CN | 1184265 C | 1/2005 |
| CN | 1769333 A | 5/2006 |
| CN | 101778894 A * | 7/2010 |
| CN | 101831090 A | 9/2010 |
| EP | 2 177 570 A1 | 4/2010 |
| JP | 2006-510763 A | 3/2006 |
| KR | 2006-0052657 | 5/2006 |
| KR | 10-0851786 | 8/2008 |
| WO | WO 01/40356 A1 | 6/2001 |
| WO | WO 01/98395 A1 | 12/2001 |
| WO | WO 2008/078849 A1 | 7/2008 |
| WO | WO 2009/020261 | 2/2009 |

OTHER PUBLICATIONS

International Search Report for PCT/CN2012/071865 issued from the State Intellectual Property Office, the P.R. China, dated Jun. 14, 2012 (6 pages).

* cited by examiner

CONDUCTIVE FULL VULCANIZED THERMOPLASTIC ELASTOMER AND ITS PREPARATION METHOD

TECHNICAL FIELD

The invention relates to a full vulcanized thermoplastic elastomer. More specially, the invention relates to a conductive full vulcanized thermoplastic elastomer and its preparation method.

TECHNOLOGY BACKGROUND

Full vulcanized thermoplastic elastomer is a new material developed in 1980's and it has characteristic performances of both plastics and rubber, which shows high elasticity of rubber at room temperature and can be also plasticizing-shaped at high temperature. The strength, elasticity, heat resistance and compressive permanent deformation resistance of full vulcanized thermoplastic elastomer are much higher than those of non-crosslinked thermoplastic elastomer, and at the same time its chemistry resistance and processing stability are significantly improved, and the blending ratio of rubber and plastics can vary in a broader range such that the material performance can adjust largely and thus its application ranges are very broad. In traditional technology, full vulcanized thermoplastic elastomer is prepared by dynamic vulcanization of thermoplastic elastomer and rigid thermoplastic plastics under certain condition.

China patent CN1184265C of the applicant (application date: Jun. 15, 2001, priority date: Jun. 15, 2000, Patent number ZL01801655.3) provides a full vulcanized thermoplastic elastomer having controllable particle diameter of rubber phase and sphere-like shape and its preparation method. Such full vulcanized thermoplastic elastomer is prepared through common blending method for processing rubber and plastics by blending and granulating full vulcanized powdered rubber and plastics via rubber plastics blending equipment. The weight ratio of full vulcanized powdered rubber to plastics is in the range from 30:70 to 75:25, preferably 50:50-75:25, wherein rubber component is rubber particle having crosslinking structure and its mean particle diameter is in the range from 0.02 to 1 μm, preferably 0.05 to 0.5 μm, more preferably 0.05 to 0.2 μm. Such rubber particle has gel content of 60 wt % or greater which can be selected from the full vulcanized powdered rubber prepared from international patent application WO01/40356 filed on Sep. 18, 2000 by this applicant including at least one full vulcanized powdered rubber selected from the group consisting of full vulcanized powdered natural rubber, full vulcanized powdered styrene butadiene rubber, full vulcanized powdered carboxylic styrene butadiene rubber, full vulcanized powdered nitrile rubber, full vulcanized powdered carboxylic nitrile rubber, full vulcanized powdered polybutadiene rubber, full vulcanized powdered chloroprene rubber, full vulcanized powdered silicone rubber, full vulcanized powdered acrylate rubber, full vulcanized powdered butadiene-styrene-vinylpyridine rubber, full vulcanized powdered isoprene rubber, full vulcanized powdered butyl rubber, full vulcanized powdered polysulfide rubber, full vulcanized powdered acrylate-butadiene rubber, full vulcanized powdered polyurethane rubber and full vulcanized powdered fluorubber etc, and the plastics of the full vulcanized thermoplastic elastomer comprise at least one selected from the group consisting of polypropylene, polyethylene, polyamide polyvinylchloride, polyurethane, polyester, polycarbonate, polyformaldehyde, polystyrene, polyphenylene sulfide, polyimide, and polysulfone etc.

In addition, China patent CN1381524A of the applicant (application date: Apr. 18, 2001, Patent number ZL01110734.0) provides a full vulcanized polyolefin thermoplastic elastomer and its preparation method. Such full vulcanized polyolefin thermoplastic elastomer is prepared by blending components including polyolefin plastics and rubber, wherein the weight ratio of rubber component to polyolefin plastics is in the range from 30:70 to 75:25, preferably 50:50 to 75:25, and rubber component is rubber particle having crosslinking structure. Such rubber particle is preferably homogenous phase structure and its mean particle diameter is in the range from 0.02 to 1 μm, preferably 0.05 to 0.5 μm, more preferably 0.05 to 0.3 μm. Such rubber particle has gel content of 60 wt % or greater, preferably 80 wt % or greater which can be selected from the full vulcanized powdered rubber prepared from international patent application WO01/40356 (priority date: Dec. 3, 1999) filed on Sep. 18, 2000 by this applicant including at least one full vulcanized powdered rubber selected from the group consisting of full vulcanized powdered natural rubber, full vulcanized powdered styrene butadiene rubber, full vulcanized powdered polybutadiene rubber and full vulcanized powdered silicone rubber etc. Alternatively, such rubber particle can be selected from the crosslinked type powdered rubber prepared from China patent CN1353131A of the applicant (application date: Nov. 3, 2000, Patent number ZL00130386.4) which can comprise at least one of crosslinked type powdered styrene butadiene rubber and crosslinked type powdered polybutadiene rubber etc. The polyolefin plastics of full vulcanized polyolefin thermoplastic elastomer comprises homopolymer, copolymer of polyolefin plastics and blends thereof and preferably at least one of polypropylene, polypropylene copolymer, polyethylene and polyethylene copolymer etc.

The above full vulcanized thermoplastic elastomer was prepared through common blending method for processing rubber and plastics by melt-blending and granulating components including full vulcanized powdered rubber and plastics via rubber plastics blending equipment under common plastics processing temperature.

The full vulcanized thermoplastic elastomers provided by CN11842650 and CN1381524A have good controllable particle diameter and gel content of rubber phase and good mechanic properties compared to the full vulcanized thermoplastic elastomer prepared by traditional dynamic vulcanization method. In particular, they have higher whiteness value and can be easily made into light colorful products, and can be easily dyed and made into other colorful products. At the same time, the preparation methods of full vulcanized thermoplastic elastomers from these patent applications are simple. Contrast to the dynamic vulcanization method, common rubber plastics blending equipment is used without particular equipments, and the process is simple and the processing conditions can be controlled easily, and furthermore, the controllability of rubber phase particle diameter and crosslinking degree are good.

However, the full vulcanized thermoplastic elastomers prepared by CN1184265C and CN1381524A are not conductive, which are not suitable to particular applications requiring conductivity.

INVENTION SUMMARY

The applicant found in the research that when full vulcanized thermoplastic elastomers are prepared by blending method with thermoplastic plastics as continuous phase and rubber particle having crosslinking structure such as full vulcanized powdered rubber as dispersed phase, only small amount of carbon nanotubes need to be added to form effective conductive channel such that the resulting thermoplastic elastomers have good conductivity and their other original properties are not affected substantially, because full vulcanized powdered rubber were vulcanized before blending which is dispersed phase during blending and can be dispersed homogeneously in the plastics matrix such that the added carbon nanotubes cannot be dispersed or embedded in the rubber phase and can be dispersed in the plastics continuous phase and can be distributed between rubber dispersed phase when small amount of conductive material such as carbon nanotubes are added.

An object of this invention is to provide conductive full vulcanized thermoplastic elastomers with good conductivity.

Another object of this invention is to provide a method for preparing the conductive full vulcanized thermoplastic elastomers. According to the method of this invention, the conductive full vulcanized thermoplastic elastomers are prepared by blending plastics, rubber particle and conductive fillers once, wherein the process is simple and the use amount of conductive fillers is less.

The full vulcanized thermoplastic elastomers according to the invention comprise the following components in the form of mixture: (a) thermoplastic plastics; (b) rubber particles having crosslinking structure; (c) conductive fillers; wherein rubber particles of component (b) have mean particle diameter of 0.02 to 1 µm and gel content of 60 wt % or greater, and conductive fillers of component (c) are carbon nanotubes;

According to the invention, the microscopic phase state of the conductive full vulcanized thermoplastic elastomer is that thermoplastic plastics of component (a) are continuous phase, rubber particles of component (b) are dispersed phase, and carbon nanotubes of component (c) are dispersed in the continuous phase and distributed between the rubber particles;

By means of such microscopic phase state, only small amount of carbon nanotubes need to be added to form effective conductive channels such that the resulting full vulcanized thermoplastic elastomers have better conductivity and their other original properties are not affected substantially. In addition, there is no particular requirement for the size of carbon nanotubes.

In contrast, in the prior arts, when carbon nanotubes are used to modify plastics or thermoplastic elastomer materials prepared by polymerization, since there is no size exclusion effect resulted from vulcanized rubber particle as rubber phase, such particular microscopic phase state cannot occur such that carbon nanotubes are dispersed in various parts of plastics matrix or are dispersed in both continuous phase and dispersed phase of thermoplastic plastics when modifying thermoplastic elastomers, and thus enough conductive channels are able to form in the matrix to obtain conductivity after certain amount carbon nanotubes are added. Furthermore, due to large addition amount, other mechanic properties of the matrix are affected. More even, carbon nanotubes with particular size are needed to modify conductivity.

According to the conductive full vulcanized thermoplastic elastomers of this invention, the weight ratio of rubber particles of component (h) to thermoplastic plastics of component (a) is from 30:70 to 75:25, preferably 50:50 to 75:25, and the content of conductive fillers of component (c) is from 0.3 to 10 weight parts, preferably 0.5 to 10 weight parts, more preferably 0.5 to 7 weight parts, most preferably 2 to 7 weight parts based on the total weight of rubber particles of component (b) and thermoplastic plastics of component (a) of 100 weight parts.

According to the conductive full vulcanized thermoplastic elastomers of this invention, component (b) is rubber particle having crosslinking structure, preferably rubber particle having homogeneous phase structure, and the mean particle diameter of rubber particle is 0.02 to 1 µm, preferably 0.05 to 0.5 µm, more preferably 0.05 to 0.2 µm, and the gel content of rubber particle is 60 wt % or greater, preferably 75 wt % or greater. The gel content of rubber phase in the resulting conductive full vulcanized thermoplastic elastomers is the gel content of the rubber particle having crosslinking structure itself.

According to the conductive full vulcanized thermoplastic elastomers of this invention, there is no limit for rubber types as dispersed phase, and it can be at least one rubber selected from the group consisting of natural rubber, styrene butadiene rubber, carboxylic styrene butadiene rubber, nitrile rubber, carboxylic nitrile rubber, polybutadiene rubber, silicone rubber, chloroprene rubber, acrylate rubber, butadiene-styrene-vinylpyridine rubber, isoprene rubber, butyl rubber, polysulfide rubber, acrylate-butadiene rubber, polyurethane rubber and fluorubber.

Preferably, the above rubber particles having crosslinking structure of component (b) are full vulcanized powdered rubber prepared according to international patent application WO01/40356 (priority date: Dec. 3, 1999) filed on Sep. 18, 2000 and international patent application WO01/98395 (priority date: Jun. 15, 2000) filed on Jun. 15, 2001 of the applicant. At least one of the following full vulcanized powdered rubber are preferably used during the preparation: full vulcanized powdered natural rubber, full vulcanized powdered styrene butadiene rubber, full vulcanized powdered carboxylic styrene butadiene rubber, full vulcanized powdered nitrile rubber, full vulcanized powdered carboxylic nitrile rubber, full vulcanized powdered polybutadiene rubber, full vulcanized powdered chloroprene rubber, full vulcanized powdered silicone rubber, full vulcanized powdered acrylate rubber, full vulcanized powdered butadiene-styrene-vinylpyridine rubber, full vulcanized powdered isoprene rubber, full vulcanized powdered butyl rubber, full vulcanized powdered polysulfide rubber, full vulcanized powdered acrylate-butadiene rubber, full vulcanized powdered polyurethane rubber and full vulcanized powdered fluorubber etc. Such full vulcanized powdered rubber mean free flowing rubber micro powder having gel content of 60 wt % or greater, preferably 75 wt % or greater after drying without adding parting agent. The mean particle diameter of powdered rubber in these patent applications is 0.02 to 1 µm, preferably 0.05 to 0.5 µm, more preferably 0.05 to 0.2 µm. Each microparticle of such full vulcanized powdered rubber is homogeneous, that is, composition of single microparticle is homogeneous and there is no inhomogeneous phenomenon such as lamination and phase separation etc under modern microscope technology. Particle diameter of such powdered rubber is fixed by irradiation crosslinking corresponding rubber latex.

The above rubber particles can be also crosslinked type powdered rubber prepared according to China patent CN1353131A of the applicant (application date: Nov. 3, 2000, Patent number ZL00130386.4) which comprise at least one crosslinked type powdered rubber of crosslinked type powdered styrene butadiene rubber and crosslinked type powdered polybutadiene rubber etc. Such crosslinked type powdered rubber is a powdered rubber obtained through drying with crosslinked type synthesis rubber emulsion as raw material. Such crosslinked type powdered rubber is free flowing without adding parting agent. The mean particle diameter of powdered rubber in this patent CN1353131 is 0.05 to 0.3

µm, and its gel content is 80 wt % or greater, preferably 85 wt % or greater which is consistent with the gel content of crosslinked type synthesis rubber emulsion as raw material. Each microparticle of such crosslinked type powdered rubber is homogeneous, that is, composition of single microparticle is homogeneous and there is no inhomogeneous phenomenon such as lamination and phase separation etc under modern microscope technology.

The thermoplastic plastics of component (a) according to the conductive full vulcanized thermoplastic elastomer can be selected from various thermoplastic plastics in the art, and preferably comprise at least one selected from the group consisting of polypropylene, polyethylene, polyamide, polyvinylchloride, polyurethane, polyester, polycarbonate, polyformaldehyde, polystyrene, polyphenylene sulfide, polyimide, and polysulfone and grafting modified substances of such thermoplastic plastics above (such as grafted polyethylene, grafted polypropylene etc). The above polyethylene preferably comprises at least one selected from the group consisting of low density polyethylene, linear low density polyethylene, high density polyethylene and various grafted polyethylene etc, more preferably linear low density polyethylene, grafted polyethylene or blends thereof etc. The above polypropylene preferably comprises at least one selected from the group consisting of polypropylene homopolymer, polypropylene copolymer and grafted polypropylene etc.

As component (c) conductive fillers of conductive full vulcanized thermoplastic elastomer according to the invention, it can be selected from carbon nanotubes including single walled carbon nanotubes, double wall carbon nanotubes, multi-walled carbon nanotubes or mixtures thereof, preferably multi-walled carbon nanotubes. Although there is no particular requirement for the size of carbon nanotubes, carbon nanotubes are generally selected from carbon nanotubes having mean diameter of 0.4 to 500 nm, mean length of 0.1 to 1000 µm and aspect of 0.25 to $2.5 \times 10^6$, preferably carbon nanotubes having mean diameter of 1 to 50 nm, mean length of 1 to 50 µm and aspect of 20 to $1 \times 10^4$ according to current market condition and material availability.

Some common aiding agents during the processing of full vulcanized thermoplastic plastics can be included in the conductive full vulcanized thermoplastic elastomer according to the invention, which comprise for example antioxidants, colorants, processing aiding agents etc, and their use amount are conventional amounts or can be adjusted according to practice case.

The invention also provides a method for preparing the conductive full vulcanized thermoplastic elastomer according to the invention, wherein components including the thermoplastic plastics of component (a), the rubber particles having crosslinking structure of component (b) and the conductive fillers of component (c) according to the invention are subjected to pass through rubber plastics blending equipment and melt-blended once to obtain the conductive full vulcanized thermoplastic elastomer by common melt-blending method for processing rubber and plastics.

During preparation, the blending temperature of materials (i.e. common processing temperature of the thermoplastic plastics) shall be selected from the range of temperatures which can guarantee the full melting of thermoplastic plastics and cannot decompose it. In addition, according to processing requirement, suitable amount of common aiding agents for processing plastics can be added into blending materials. During blending, each component of rubber particles, conductive fillers and thermoplastic plastics etc can be metered and added into melt-blending equipment simultaneously for melt-blending. Alternatively, each component are firstly premixed evenly through common mixing equipment and then once melt-blended and extruded through rubber plastics blending equipment to obtain the full vulcanized thermoplastic elastomer.

The rubber plastics blending equipments used in the preparation according to the invention can be mixing mill, internal mixer, single screw extruder, double screw extruder or torque rheometer etc. The material mixing equipments are selected from mechanic mixing equipments such as high speed mixer, kneader etc in the art.

The conductive full vulcanized thermoplastic elastomer according to the invention is obtained by once melt-blending components including rubber particles having crosslinking structure, thermoplastic plastics and conductive fillers etc. Only small amount of conductive fillers need to be added to form effective conductive channel such that the resulting thermoplastic elastomers have good conductivity and combination properties simultaneously, because rubber phase had crosslinking structure before preparation and is dispersed phase during preparation and can be dispersed homogeneously in the plastics continuous phase during blending such that the conductive fillers cannot be dispersed or embedded in the rubber phase and can be dispersed in the plastics continuous phase and can be distributed between rubber particles. The resulting conductive full vulcanized thermoplastic elastomers according to the invention can be used to produce electronic production equipment, means, electronic instrument, instrument housing and decorative materials of clean production workshop having static resistance, electro magnetic interference resistance and clean requirement. The preparation method of the invention uses common rubber plastics blending equipment, general melt-blending extrusion method, rubber particles having crosslinking structure and conductive fillers under conventional blending process conditions to prepare conductive full vulcanized thermoplastic elastomers, and thus its process is simple and the equipment is low cost, processing performance can be improved, process conditions can be easily controlled, the amount of conductive fillers of the resulting products are low and can be suitable for the requirement of batch production in the industry.

EXAMPLES

The invention is further described by the following examples. However, the scopes of the invention are not limited by these examples, and the scopes of the invention depend on the enclosed claims.

Example 1-1

Full vulcanized powdered styrene butadiene rubber (Beijing Research Institute of Chemical Industry of China Petroleum & Chemical Corporation, VP101A, gel content of 84 wt %, mean particle diameter of 100 nm), carbon nanotubes (Beijing Cnano Technology Co., Ltd, FloTube 9000, multi-walled carbon nanotubes, mean length of 10 µm, mean diameter of 11 nm), linear low density polyethylene (Qilu company of China Petroleum & Chemical Corporation, model 7042), antioxidant 1010 (produced by Ciba-Geigy, Switzerland) and 168 (produced by Ciba-Geigy, Switzerland) are mixed sufficiently in the mixer, wherein the weight ratio of full vulcanized powdered rubber to polyethylene is 60/40, the weight ratio of carbon nanotubes to the total weight of polyethylene and full vulcanized powdered rubber is 3/100, antioxidants 1010 and 168 constitute 0.2 wt % and 0.4 wt % of the total weight of full vulcanized powdered rubber and polyethylene, respectively, and subsequently are melt-blended using Branbender torque rheometer, wherein the oil bath temperature for blending is 200° C. and the revolution of torque rheometer is 60 revolution/minute (rpm). The materials are discharged after plasticized evenly. The resulting sample are made into sheets by using double roller mill (the temperature is set to 200° C.), and the materials are made into standard strips by using molding method and various properties are measured. The measure results of conductive full vulcanized styrene butadiene rubber/polyethylene thermoplastic elastomer are listed in table 1.

Example 1-2

Example 1-2 is same as example 1-1, except that the weight ratio of carbon nanotubes to the total weight of polyethylene and full vulcanized powdered styrene butadiene rubber is 4/100. The measure results of conductive full vulcanized styrene butadiene rubber/polyethylene thermoplastic elastomer are listed in table 1.

Example 1-3

Example 1-3 is same as example 1-1, except that the weight ratio of carbon nanotubes to the total weight of polyethylene and full vulcanized powdered styrene butadiene rubber is 5/100. The measure results of conductive full vulcanized styrene butadiene rubber/polyethylene thermoplastic elastomer are listed in table 1.

Example 1-4

Example 1-4 is same as example 1-1, except that the weight ratio of carbon nanotubes to the total weight of polyethylene and full vulcanized powdered styrene butadiene rubber is 6/100. The measure results of conductive full vulcanized styrene butadiene rubber/polyethylene thermoplastic elastomer are listed in table 1.

Comparative Example 1-1

Comparative example 1-1 is same as example 1-1, except that carbon nanotubes are not added. The experiment results are listed in table 1.

Example 1-5

Figure 1:
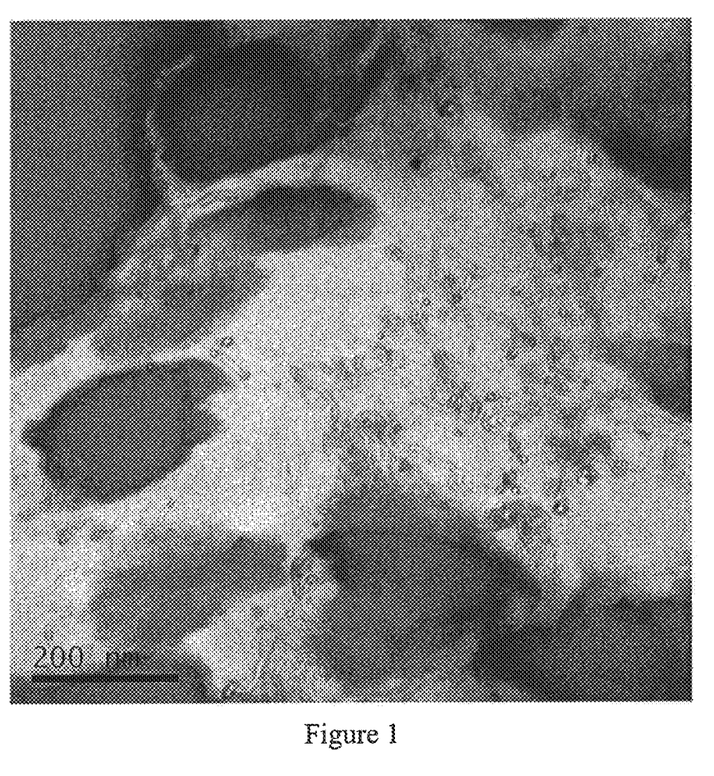
FIG. 1 is a graph of transmission electron microscope (TEM) of microscopic phase state of the resulting full vulcanized thermoplastic elastomers according to example 1-5.

Example 1-5 is same as example 1-2, except that the weight ratio of full vulcanized powdered styrene butadiene rubber to polyethylene is 40/60. The measure results of conductive full vulcanized styrene butadiene rubber/polyethylene thermoplastic elastomer are listed in table 1. FIG. 1 shows a graph of transmission electron microscope (TEM) of microscopic phase state of the resulting full vulcanized thermoplastic elastomers according to this example, wherein the black granulate shadow is full vulcanized powdered styrene butadiene and the tube-like substances distributed between particles are carbon nanotubes.

Comparative Example 1-2

Comparative example 1-2 is same as example 1-5, except that carbon nanotubes are not added. The experiment results are listed in table 1.

Example 1-6

Example 1-6 is same as example 1-2, except that the weight ratio of full vulcanized powdered styrene butadiene rubber to polyethylene is 50/50. The measure results of conductive full vulcanized styrene butadiene/polyethylene thermoplastic elastomer are listed in table 1.

Comparative Example 1-3

Comparative example 1-3 is same as example 1-6, except that carbon nanotubes are not added. The experiment results are listed in table 1.

Example 1-7

Example 1-7 is same as example 1-2, except that the weight ratio of full vulcanized powdered styrene butadiene rubber to polyethylene is 70/30. The measure results of conductive full vulcanized styrene butadiene/polyethylene thermoplastic elastomer are listed in table 1.

Comparative Example 1-4

Comparative example 1-4 is same as example 1-7, except that carbon nanotubes are not added. The experiment results are listed in table 1.

Example 1-8

Example 1-8 is same as example 1-5, except that full vulcanized powdered styrene butadiene rubber is placed by full vulcanized powdered nitrile rubber (Beijing Research Institute of Chemical Industry of China Petroleum & Chemical Corporation, VP101A, gel content of 93 wt %, mean particle diameter of 100 nm) and the weight ratio of carbon nanotubes to the total weight of polyethylene and full vulcanized powdered nitrile rubber is 3/100. The measure results of conductive full vulcanized nitrile rubber/polyethylene thermoplastic elastomer are listed in table 1.

Comparative Example 1-5

Comparative example 1-5 is same as example 1-8, except that carbon nanotubes are not added. The experiment results are listed in table 1,

TABLE 1

|  | Tensile break strength | 100% stretching strength | Tensile elongation at break | Tensile Permanent deformation | Compressive Permanent deformation | Shore hardness | volume resistance |
|---|---|---|---|---|---|---|---|
|  |  |  |  | Unit |  |  |  |
|  | MPa | MPa | % | % | % | HD | Ω · CM |
| Example 1-1 | 10.2 | 6.5 | 330 | 24 | 26.2 | 34 | $2.4 \times 10^8$ |
| Example 1-2 | 11.1 | 7.3 | 324 | 25 | 27.6 | 35 | $6.8 \times 10^6$ |
| Example 1-3 | 11.1 | 7.4 | 300 | 27 | 27.8 | 36 | $8.1 \times 10^4$ |

TABLE 1-continued

| | Tensile break strength | 100% stretching strength | Tensile elongation at break | Tensile Permanent deformation | Compressive Permanent deformation | Shore hardness | volume resistance |
|---|---|---|---|---|---|---|---|
| Unit | MPa | MPa | % | % | % | HD | $\Omega \cdot CM$ |
| Example 1-4 | 11.4 | 7.7 | 288 | 24 | 27.1 | 36 | $6.8 \times 10^4$ |
| Comparative example 1-1 | 8.8 | 5.5 | 336 | 25 | 22.7 | 32 | $2.8 \times 10^{16}$ |
| Example 1-5 | 12.2 | 8.4 | 436 | 60 | 34.1 | 42 | $8.8 \times 10^7$ |
| Comparative example 1-2 | 10.4 | 6.9 | 476 | 60 | 27.7 | 40 | $2.8 \times 10^{16}$ |
| Example 1-6 | 11.4 | 7.6 | 376 | 44 | 31.4 | 39 | $7.1 \times 10^7$ |
| Comparative example 1-3 | 9.0 | 5.9 | 400 | 42 | 24.0 | 36 | $2.8 \times 10^{16}$ |
| Example 1-7 | 9.9 | 6.1 | 320 | 20 | 25.6 | 32 | $3.2 \times 10^5$ |
| Comparative example 1-4 | 8.7 | 4.7 | 344 | 22 | 20.2 | 28 | $2.8 \times 10^{16}$ |
| Example 1-8 | — | — | — | — | 31.0 | — | $5.77 \times 10^5$ |
| Comparative example 1-5 | — | — | — | — | 30.0 | — | $1.8 \times 10^{16}$ |
| Measure standards | ASTM D412 | ASTM D412 | ASTM D412 | ASTM D412 | D395-98 | ASTM D2240-95 | ASTM D257 |

Example 2-1

Full vulcanized powdered carboxylic nitrile rubber (Beijing Research Institute of Chemical Industry of China Petroleum & Chemical Corporation, VP501, gel content of 91 wt %, mean particle diameter of 90 nm), carbon nanotubes (Beijing Cnano Technology Co., Ltd, FloTube 9000, multi-walled carbon nanotubes, mean length of 10 μm, mean diameter of 11 nm), polypropylene (BLUESTAR Tianjin Chemical Co. Ltd, number Zero special material, homopolypropylene), antioxidant 1010 (produced by Ciba-Geigy, Switzerland) and 168 (produced by Ciba-Geigy, Switzerland) are mixed sufficiently in the mixer, wherein the weight ratio of powdered rubber to polypropylene is 70/30, the weight ratio of carbon nanotubes to the total weight of polypropylene and powdered robber is 2/100, antioxidants 1010 and 168 constitute 0.2 wt % and 0.4 wt % of the total weight of powdered rubber and polypropylene, respectively, and subsequently are melt-blended using Branbender torque rheometer, wherein the oil bath temperature for blending is 210° C. and the revolution of torque rheometer is 70 revolution/minute (rpm). The materials are discharged after plasticized evenly. The resulting sample are made into sheets by using double roller mill (the temperature is set to 200° C.), and the materials are made into standard strips by using molding method and various properties are measured. The measure results of conductive full vulcanized carboxylic nitrile rubber/polypropylene thermoplastic elastomer are listed in table 2.

Example 2-2

Example 2-2 is same as example 2-1, except that the weight ratio of carbon nanotubes to the total weight of polypropylene and full vulcanized powdered carboxylic nitrile rubber is 4/100. The measure results of conductive full vulcanized carboxylic nitrile rubber/polypropylene thermoplastic elastomer are listed in table 2.

Example 2-3

Example 2-3 is same as example 2-1, except that the weight ratio of carbon nanotubes to the total weight of polypropylene and full vulcanized powdered carboxylic nitrile rubber is 7/100. The measure results of conductive full vulcanized carboxylic nitrile rubber/polypropylene thermoplastic elastomer are listed in table 2.

Example 2-4

Example 2-4 is same as example 2-1, except that the weight ratio of carbon nanotubes to the total weight of polypropylene and full vulcanized powdered carboxylic nitrile rubber is 0.5/100. The measure results of conductive full vulcanized carboxylic nitrile rubber/polypropylene thermoplastic elastomer are listed in table 2.

Comparative Example 2-1

Comparative example 2-1 is same as example 2-1, except that carbon nanotubes are not added. The experiment results are listed in table 2.

Example 2-5

Example 2-5 is same as example 2-2, except that the weight ratio of full vulcanized powdered carboxylic nitrile rubber to polypropylene is 60/40. The measure results of conductive full vulcanized carboxylic nitrile/polypropylene thermoplastic elastomer are listed in table 2.

Example 2-6

Example 2-6 is same as example 2-2, except that the weight ratio of full vulcanized powdered carboxylic nitrile rubber to polypropylene is 50/50. The measure results of conductive full vulcanized carboxylic nitrile/polypropylene thermoplastic elastomer are listed in table 2.

Example 2-7

Example 2-7 is same as example 2-2, except that the weight ratio of full vulcanized powdered carboxylic nitrile rubber to polypropylene is 75/25. The measure results of conductive full vulcanized carboxylic nitrile/polypropylene thermoplastic elastomer are listed in table 2.

Example 2-8

Example 2-8 is same as example 2-1, except that full vulcanized powdered carboxylic nitrile rubber is placed by full vulcanized powdered styrene butadiene rubber (Beijing Research Institute of Chemical Industry of China Petroleum & Chemical Corporation, VP101A, gel content of 84 wt %, mean particle diameter of 100 nm). The measure results of conductive full vulcanized styrene butadiene rubber/polypropylene thermoplastic elastomer are listed in table 2.

Comparative Example 2-2

Comparative example 2-2 is same as example 2-8, except that carbon nanotubes are not added. The experiment results are listed in table 2.

Example 2-9

Example 2-9 is same as example 2-1, except that full vulcanized powdered carboxylic nitrile rubber is placed by full vulcanized powdered silicone rubber (Beijing Research Institute of Chemical Industry of China Petroleum & Chemical Corporation, VP601A, gel content of 81 wt %, mean particle diameter of 150 nm). The measure results of conductive full vulcanized silicone rubber/polypropylene thermoplastic elastomer are listed in table 9.

Comparative Example 2-3

Comparative example 2-3 is same as example 2-9, except that carbon nanotubes are not added. The experiment results are listed in table 2.

Example 2-10

Example 2-10 is same as example 2-1, except that polypropylene is placed by maleic anhydride grafted polypropylene (Ningbo Nengzhiguang New Materials Technology Co., Ltd, GPM200AL, grafting ratio of 0.8 wt %).

Figure 2:
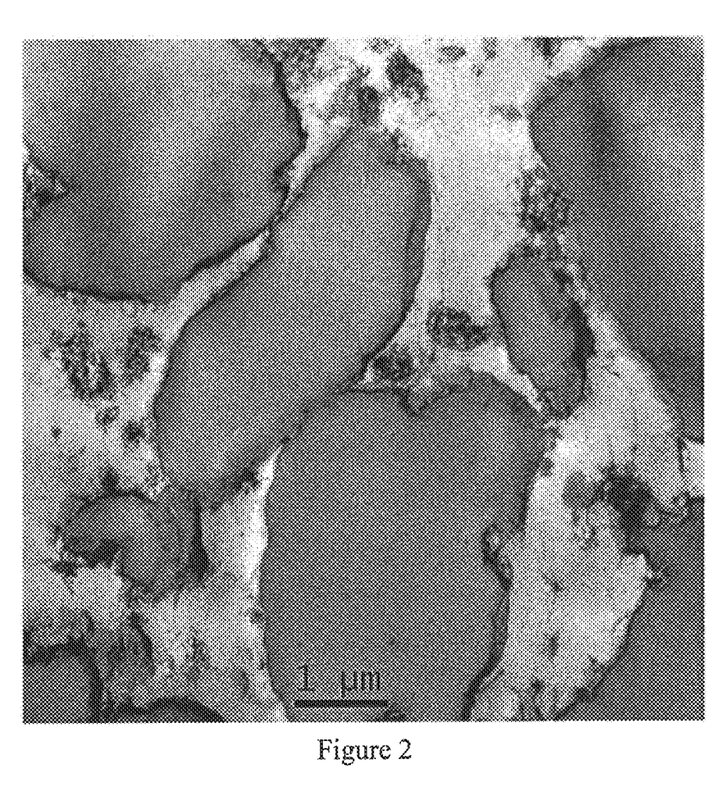
FIG. 2 is a graph of transmission electron microscope (TEM) of microscopic phase state of the resulting full vulcanized thermoplastic elastomers according to example 2-10.

FIG. 2 shows a graph of transmission electron microscope (TEM) of microscopic phase state of the resulting full vulcanized thermoplastic elastomers according to this example. Thus, it can be seen that carbon nanotubes as conductive fillers are dispersed in the plastics continuous phase and distributed between rubber particles of full vulcanized powdered rubber.

TABLE 2

|  | Tensile break strength | Tensile Permanent deformation | Compressive Permanent deformation | volume resistance | Shore hardness (D) |
|---|---|---|---|---|---|
| Unit | MPa | % | % | Ω · CM | — |
| Example 2-1 | 6.4 | 8 | 42 | $7.0 \times 10^5$ | 43 |
| Example 2-2 | 7.9 | 8 | 49 | $9.3 \times 10^4$ | 51 |
| Example 2-3 | 8.5 | 4 | 47 | $4.9 \times 10^4$ | 49 |
| Example 2-4 | 5.2 | 4 | 45 | $4.7 \times 10^{11}$ | 45 |
| Comparative example 2-1 | 7.0 | 28 | 45 | $8.7 \times 10^{18}$ | 46 |
| Example 2-5 | 7.8 | 4 | 54 | $9.6 \times 10^4$ | 58 |
| Example 2-6 | 11.3 | 4 | 55 | $6.7 \times 10^8$ | 58 |
| Example 2-7 | 6.1 | 4 | 38 | $7.6 \times 10^6$ | 42 |
| Example 2-8 | 5.9 | 8 | 50 | $1.5 \times 10^5$ | 38 |
| Comparative example 2-2 | 6.3 | 28 | 65 | $1.7 \times 10^{13}$ | 37 |
| Example 2-9 | 5.8 | 4 | 48 | $5.3 \times 10^6$ | 38 |
| Comparative example 2-3 | 6.8 | 28 | 46 | $3.4 \times 10^{14}$ | 37 |
| Example 2-10 | 9.5 | 28 | 50 | $8.2 \times 10^7$ | 40 |
| Measure standards | ASTM D412 | ASTM D412 | ASTM D395-98 | ASTM D257 | ASTM D2240-95 |

Example 3-1

Figure 3:
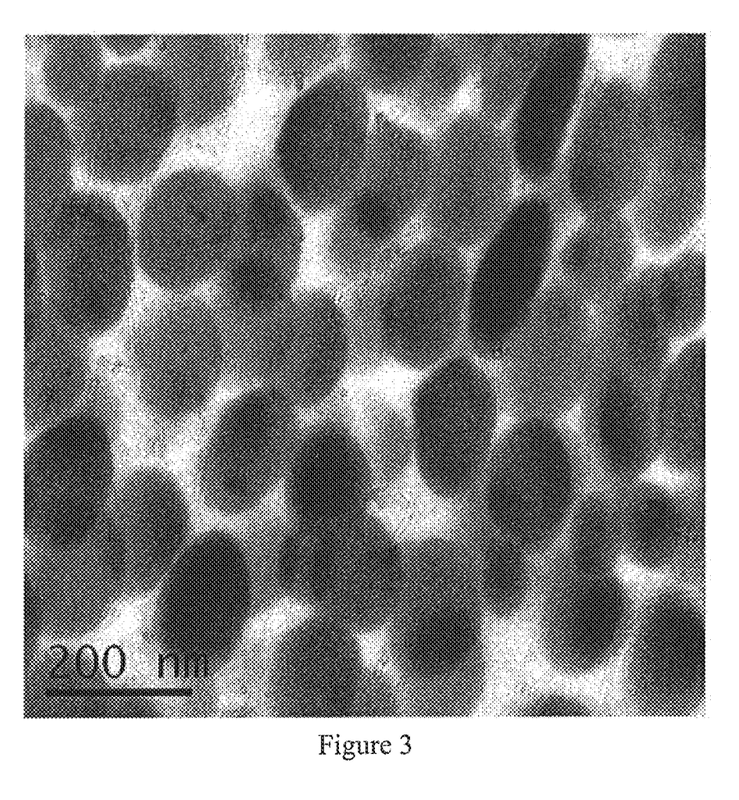
FIG. 3 is a graph of transmission electron microscope (TEM) of microscopic phase state of the resulting full vulcanized thermoplastic elastomers according to example 3-1.

Full vulcanized powdered carboxylic styrene butadiene rubber (Beijing Research Institute of Chemical Industry of China Petroleum & Chemical Corporation, VP201, gel content of 87 wt %, mean particle diameter of 150 nm), carbon nanotubes (Beijing Cnano Technology Co., Ltd, FloTube 9000, multi-walled carbon nanotubes, mean length of 10 μm, mean diameter of 11 nm), Nylon 6 (UBE, Japan, 1013B), antioxidant 1010 (produced by Ciba-Geigy, Switzerland) and 168 (produced by Ciba-Geigy, Switzerland) are mixed sufficiently in the mixer, wherein the weight ratio of full vulcanized powdered carboxylic styrene butadiene rubber to Nylon 6 is 50/50, the weight ratio of carbon nanotubes to the total weight of Nylon 6 and full vulcanized powdered carboxylic styrene butadiene rubber is 4/100, antioxidants 1010 and 168 constitute 0.2 wt % and 0.4 wt % of the total weight of powdered rubber and polyethylene, respectively, and subsequently are melt-blended using Branbender torque rheometer, wherein the oil bath temperature for blending is 240° C. and the revolution of torque rheometer is 60 revolution/minute (rpm). The materials are discharged after plasticized evenly. The resulting sample are made into sheets by using double roller mill (the temperature is set to 240° C.), and the materials are made into standard strips by using molding method and various properties are measured. The measure results of conductive full vulcanized powdered carboxylic styrene butadiene rubber/Nylon 6 thermoplastic elastomer are listed in table 3. FIG. 3 shows a graph of transmission electron microscope (TEM) of microscopic phase state of the resulting full vulcanized thermoplastic elastomers according to this example, wherein the black granulate shadow is full vulcanized powdered carboxylic styrene butadiene rubber and the tube-like substances distributed between particles are carbon nanotubes.

Comparative Example 3-1

Comparative example 3-1 is same as example 3-1, except that carbon nanotubes are not added. The experiment results are listed in table 3.

TABLE 3

|  | Tensile break strength | Tensile Permanent deformation | Compressive Permanent deformation | volume resistance | Shore hardness (D) |
|---|---|---|---|---|---|
| Unit | MPa | % | % | Ω · CM | — |
| Example 3-1 | — | — | 53 | $5 \times 10^5$ | — |
| Comparative example 3-1 | — | — | 48 | $1.0 \times 10^{15}$ | — |

TABLE 3-continued

| | Tensile break strength | Tensile Permanent deformation | Compressive Permanent deformation | volume resistance | Shore hardness (D) |
|---|---|---|---|---|---|
| Measure standards | ASTM D412 | ASTM D412 | ASTM D395-98 | ASTM D257 | ASTM D2240-95 |

The invention claimed is:

1. A conductive full vulcanized thermoplastic elastomer comprising the following components in the form of mixture:
(a) thermoplastic plastics; (b) rubber particles having crosslinking structure; (c) conductive fillers;
wherein the rubber particles of component (b) have mean particle diameter of 0.02 to 1 μm, gel content of 60 wt % or greater, and homogenous structure; and the conductive fillers of component (c) include carbon nanotubes;
the microscopic phase state of the conductive full vulcanized thermoplastic elastomer is that the thermoplastic plastics of component (a) are continuous phase, the rubber particles of component (b) are dispersed phase, and the carbon nanotubes of component (c) are dispersed in the continuous phase and distributed between the rubber particles and are not dispersed or embedded in the rubber phase;
wherein the weight ratio of the rubber particles of component (b) to the thermoplastic plastics of component (a) is from 30:70 to 75:25, and the content of the conductive fillers of component (c) is from 0.3 to 10 weight percentage of the total weight of the rubber particles of component (b) and the thermoplastic plastics of component (a).

2. The conductive full vulcanized thermoplastic elastomer according to claim 1, wherein the thermoplastic plastics of component (a) are at least one selected from the group consisting of polypropylene, polyethylene, polyamide, polyvinylchloride, polyurethane, polyester, polycarbonate, polyformaldehyde, polystyrene, polyphenylene sulfide, polyimide, polysulfone or grafting modified substances of such thermoplastic plastics above.

3. The conductive full vulcanized thermoplastic elastomer according to claim 1, wherein the rubber particles having crosslinking structure of component (b) have gel content of 75 wt % or greater.

4. The conductive full vulcanized thermoplastic elastomer according to claim 1, wherein the rubber particles having crosslinking structure of component (b) have mean particle diameter of 0.05 to 0.5 μm.

5. The conductive full vulcanized thermoplastic elastomer according to claim 1, wherein the carbon nanotubes are at least one selected from the group consisting of single walled carbon nanotubes, double wall carbon nanotubes and multi-walled carbon nanotubes.

6. The conductive full vulcanized thermoplastic elastomer according to claim 1, wherein the carbon nanotubes are multi-walled carbon nanotubes.

7. The conductive full vulcanized thermoplastic elastomer according to claim 1, wherein the carbon nanotubes have mean diameter of 0.4 to 500 nm, mean length of 0.1 to 1000 μm, and aspect ratio of 0.25 to $2.5 \times 10^6$.

8. The conductive full vulcanized thermoplastic elastomer according to claim 1, wherein the carbon nanotubes have mean diameter of 1 to 50 nm, mean length of 1 to 50 μm, and aspect ratio of 20 to $1 \times 10^4$.

9. The conductive full vulcanized thermoplastic elastomer according to claim 1, wherein the weight ratio of rubber particles of component (b) to thermoplastic plastics of component (a) is from 50:50 to 75:25.

10. The conductive full vulcanized thermoplastic elastomer according to claim 1, wherein the content of conductive fillers of component (c) is from 0.5 to 10 weight parts based on the total weight of rubber particles of component (b) and thermoplastic plastics of component (a) of 100 weight parts.

11. The conductive full vulcanized thermoplastic elastomer according to claim 1, wherein the content of conductive fillers of component (c) is from 0.5 to 7 weight parts based on the total weight of rubber particles of component (b) and thermoplastic plastics of component (a) of 100 weight parts.

12. The conductive full vulcanized thermoplastic elastomer according to claim 1, wherein the thermoplastic plastics of component (a) comprises polyethylene, and wherein the polyethylene comprises at least one selected from the group consisting of low density polyethylene, linear low density polyethylene, high density polyethylene and grafted polyethylene.

13. The conductive full vulcanized thermoplastic elastomer according to claim 1, wherein the thermoplastic plastics of component (a) comprises polypropylene, and wherein the polypropylene comprises at least one selected from the group consisting of polypropylene homopolymer, polypropylene copolymer and grafted polypropylene.

14. The conductive full vulcanized thermoplastic elastomer according to claim 1, wherein the rubber particles having crosslinking structure of component (b) are full vulcanized powdered rubber or crosslinked type powdered rubber.

15. The conductive full vulcanized thermoplastic elastomer according to claim 1, wherein the rubber particles having crosslinking structure of component (b) are full vulcanized powdered rubber comprising at least one selected from the group consisting of full vulcanized powdered natural rubber, full vulcanized powdered styrene butadiene rubber, full vulcanized powdered carboxylic styrene butadiene rubber, full vulcanized powdered nitrile rubber, full vulcanized powdered carboxylic nitrile rubber, full vulcanized powdered polybutadiene rubber, full vulcanized powdered chloroprene rubber, full vulcanized powdered silicone rubber, full vulcanized powdered acrylate rubber, full vulcanized powdered butadiene-styrene-vinylpyridine rubber, full vulcanized powdered isoprene rubber, full vulcanized powdered butyl rubber, full vulcanized powdered polysulfide rubber, full vulcanized powdered acrylate-butadiene rubber, full vulcanized powdered polyurethane rubber and full vulcanized powdered fluorubber.

16. The conductive full vulcanized thermoplastic elastomer according to claim 1, wherein the rubber particles having crosslinking structure of component (b) are crosslinked type powdered rubber which comprise crosslinked type powdered styrene butadiene rubber or crosslinked type powdered polybutadiene rubber.

17. A method for preparing the conductive full vulcanized thermoplastic elastomer according to claim 1, wherein components including the thermoplastic plastics of component (a), the rubber particles having crosslinking structure of component (b) and the conductive fillers of component (c) are subjected to pass through plastics blending equipment and melt-blended once to obtain the conductive full vulcanized thermoplastic elastomer.

* * * * *